(12) United States Patent
Kumar

(10) Patent No.: US 6,954,934 B2
(45) Date of Patent: Oct. 11, 2005

(54) MANAGEMENT OF LINKS TO DATA EMBEDDED IN BLOCKS OF DATA

(75) Inventor: Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 09/811,060

(22) Filed: Mar. 15, 2001

(65) Prior Publication Data

US 2002/0133633 A1 Sep. 19, 2002

(51) Int. Cl.[7] .................................................. G06F 9/00
(52) U.S. Cl. ........................ 719/317; 709/202; 709/250
(58) Field of Search ................................ 719/310–320; 709/217, 250, 200–203; 345/744, 765; 370/352

(56) References Cited

U.S. PATENT DOCUMENTS

| | | | | |
|---|---|---|---|---|
| 5,892,908 A | * | 4/1999 | Hughes et al. ............... | 709/250 |
| 6,263,364 B1 | * | 7/2001 | Najork et al. ................ | 709/217 |
| 6,710,786 B1 | * | 3/2004 | Jacobs et al. ................ | 345/744 |
| 6,724,403 B1 | * | 4/2004 | Santoro et al. .............. | 345/765 |
| 6,747,970 B1 | * | 6/2004 | Lamb et al. ................. | 370/352 |
| 6,775,026 B1 | * | 8/2004 | Kato .......................... | 358/1.15 |

* cited by examiner

*Primary Examiner*—St. John Courtenay, III
(74) *Attorney, Agent, or Firm*—Steven D. Yates

(57) ABSTRACT

Management of links, such as URLs or other link formats, that have been embedded within blocks of data, such as data received by an E-mail application program, file transfer program, or other data transfer environment. When a block of data is received, an agent or other construct examines the block of data to identify links within the block of data. Meta-data associated with the link is extracted, and the link and associated meta-data is stored in a collective. The collective may be displayed and organized with a viewer. The viewer may be integral to an application program, such as an E-mail application program, or it may integral to an operating system, or it may be a standalone application program.

35 Claims, 8 Drawing Sheets

MANAGEMENT OF LINKS TO DATA EMBEDDED IN BLOCKS OF DATA

FIELD OF THE INVENTION

The invention generally relates to electronic document distribution and management of embedded links to data in an electronic document, and more particularly to identifying, storing and organizing links embedded within multiple electronic documents.

BACKGROUND

In recent years, electronic document delivery systems, such as Electronic Mail (E-mail), have become a conventional means for communicating in business and non-business environments. Initially, limited network resources restricted message content. However, recent advances in network infrastructure have made fast networks generally available. This has fostered support for delivery systems that support sending and receiving large amounts of data, e.g., file attachments, Object Linking and Embedding (OLE) embedded data, complex HyperText Markup Language (HTML) formatting, etc., along with traditional text messages.

While such capabilities are convenient, the aggregate effect of sending large electronic documents is significant negative impact on network performance. In some circumstances, a network and/or its delivery system (e.g., mail handling software/hardware) may be disabled due to an inability to process large amounts of data being sent electronically. For example, in an E-mail system, if a large message is sent to a distribution list, this often results in many copies of the same data being sent over the network, and being stored in recipient mailboxes. This can quickly exhaust storage resources.

To compensate, one solution has been to embed links to data in an electronic document, instead of embedding or attaching the data itself to the electronic document. For example, in an E-mail context, one may embed Uniform Locators (URLs) linking to data within an E-mail message, instead of attaching that data to the message. This allows a single data copy to reside on the network, while also allowing numerous recipients opportunity to access the data without appreciable impact to resources.

Unfortunately, this solution gives rise to a link management problem. Since received links may be embedded in many different electronic documents, it is difficult to track and organize them. For example, in order to access linked data within a particular E-mail message, a user must first locate the particular E-mail message containing a desired link. This can be a tedious search process when there is a lot of mail. Or, if the user desires all links received concerning a particular topic, the user has to search all messages since there is no cross-referencing of links to particular topics.

In addition, notwithstanding difficulty in locating links, although some E-mail readers provide for retaining offline copies of E-mail messages (e.g., Microsoft Outlook), no provision is made to retain offline copies of data linked within a message. When offline, if one activates (e.g., clicks or equivalent) a link, the linked data is not available. In addition, linked data might change, causing archived emails to lose context. There is no way to snapshot or archive complete data related to a message.

BRIEF DESCRIPTION OF THE DRAWINGS

The features and advantages of the present invention will become apparent from the following detailed description of the present invention in which.

DETAILED DESCRIPTION

Figure 1:
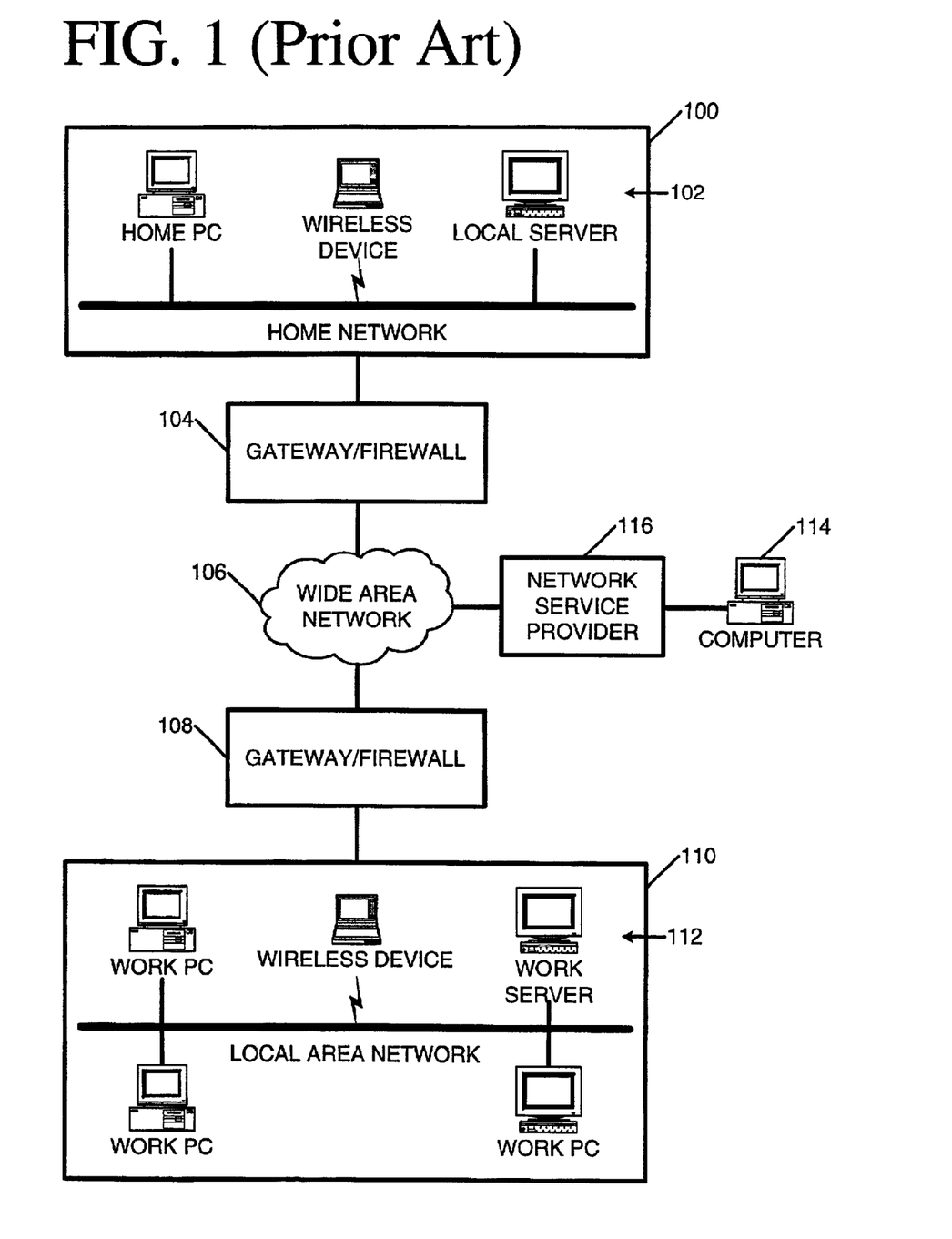
FIG. 1 illustrates an exemplary prior-art network environment in which the invention may operate.

FIG. 1 illustrates an exemplary prior-art network environment in which the invention may operate. As illustrated, there may be a home network 100 with several different types of computing devices 102 in communication with a gateway 104 providing a connection to a network 106, e.g., an intranet, the Internet, or other network. It will be appreciated that the gateway may be implemented through a combination of gateways, routers, firewalls, Network Address Translator (NAT) devices, wireless links, or other communication means.

Similarly, another gateway 108 may connect a business network 110, which may have several different types of computing devices 112, to the network 106. Thus, both the home 100 and business 110 networks are directly connected to the network and communicatively coupled to each other through the network. It is assumed networks having direct connections to the network are providing their own networking services, such as receiving electronic mail (E-mail) for the network.

This contrasts a typical connection for an end-user computer 114 that obtains a network connection by way of an Network Service Provider (NSP), such as an Internet Service Provider if network 106 is the Internet. In the typical end-user configuration, the NSP provides networking services such as E-mail receipt, file transfer, web page hosting, etc. It will be appreciated that the home 100, business 110, and end-user 114 computing environments may have some or all networking services provided by external servers. The home, business and end-user computing environments may exchange electronic documents, and associated data, e.g., using an E-mail application program to send E-mail attachments, embedded data, etc., over network 106.

Figure 2:
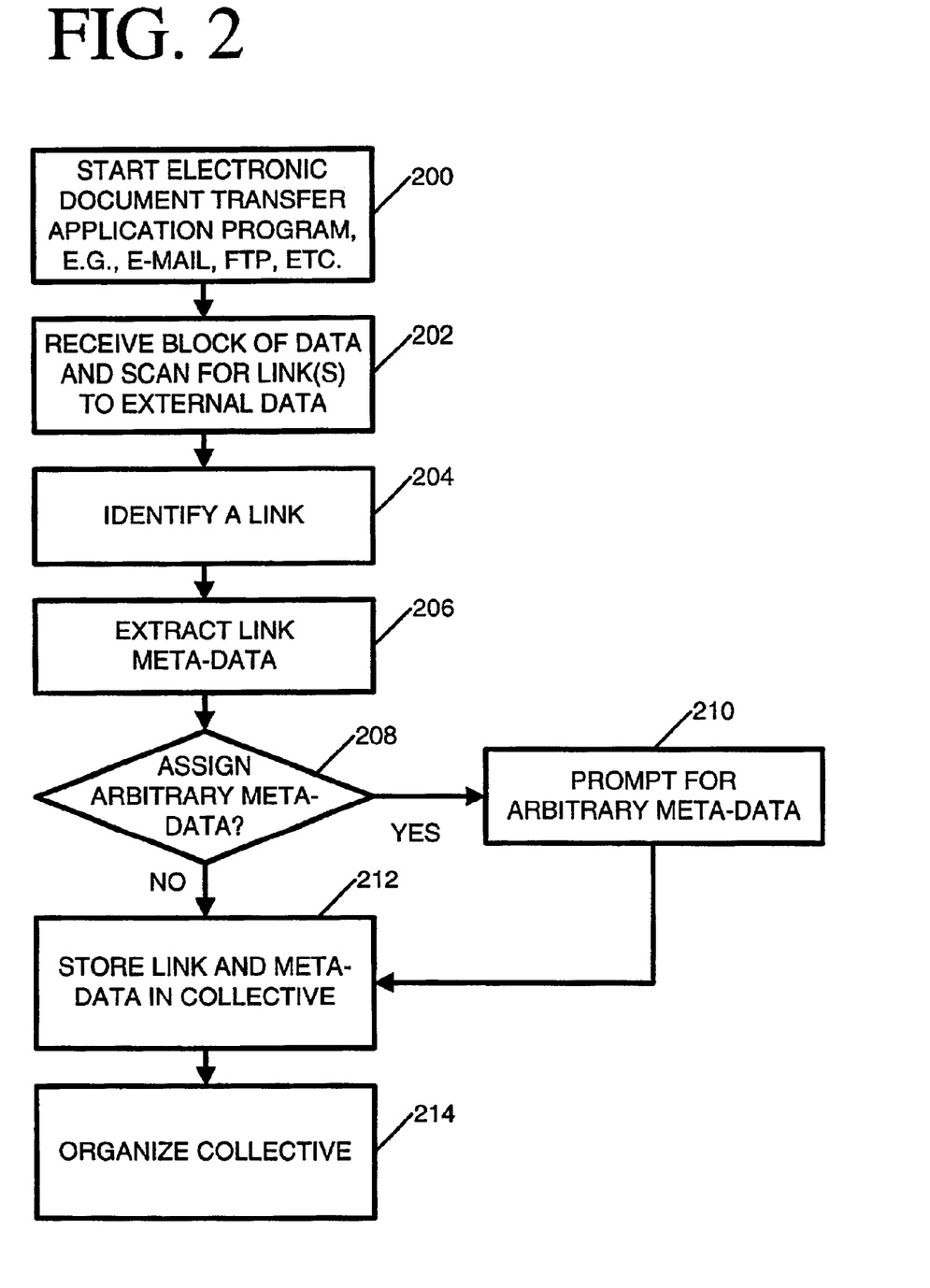
FIG. 2 is a flowchart, according to one embodiment, for managing links to data that are embedded within electronic documents.

FIG. 2 is a flowchart, according to one embodiment, for managing links to data that are embedded within electronic documents. The first illustrated operation is to start 200 an electronic document transfer application program, such as an E-mail client, file transfer program (e.g., FTP, etc.), document server (e.g., Wide Area Information Server (WAIS), Gopher, Archie, etc.), web server, etc. It will be appreciated that the program may already be executing, such as for server application programs or services.

The program receives a block of data and scans 202 the block of data for links to data external to the block of data. For example, if the program is an E-mail client, then the block of data may be an E-mail message being received, an attachment to the message, an embedded object within the message, or envelope data (e.g., header/envelope data and/or fields controlling routing and/or delivery of the message). If the program is a file transfer program, such as the Unix "FTP" tool, the block of data may a particular file being transferred, or it may be the control data (command stream) sent between the FTP server and client. If the program is a web browser client, the block of data may be web page data, objects defined within the web page, or other data blocks sent to the web browser.

The program identifies 204 a link within the block of data, and extracts 206 meta-data associated with the link. In one embodiment, after extracting meta-data, a test 208 is performed to determine whether to assign arbitrary meta-data to the link. If so, in one embodiment, a user of the program is prompted 210 to enter the arbitrary meta-data to associate with the link. In another embodiment (not illustrated), rather than prompting, instead the arbitrary meta-data is predetermined and assigned automatically to all links. For example, in such fashion, information concerning the user, e.g., name, department, personal profile data, etc., may be associated with all links identified 204 for the user.

After prompting for the arbitrary meta-data, or if it is not to be assigned, the link and meta-data are stored 212 in a collective. In one embodiment, the collective comprises a database having any proprietary or standardized format. For example, the database may be encoded as a tag based structure in the Extensible Markup Language (XML), in a binary format, such as one compatible with a Microsoft Access database, or in another format. In another embodiment, the collective is defined within an existing encoding environment, where the existing encoding environment is put to a new use.

After storing the collective, the collective may then be organized 214 for presentation to a user or another application program. In one embodiment, the organization does not change the storage format for the links and meta-data extracted 206 from the block of data. Instead, organization comprises defining one or more "views" on the stored 212 data, and these views are stored separately. This configuration allows arbitrarily numerous views to be constructed and concurrently available, while not increasing the storage requirements for the stored data.

Figure 3:
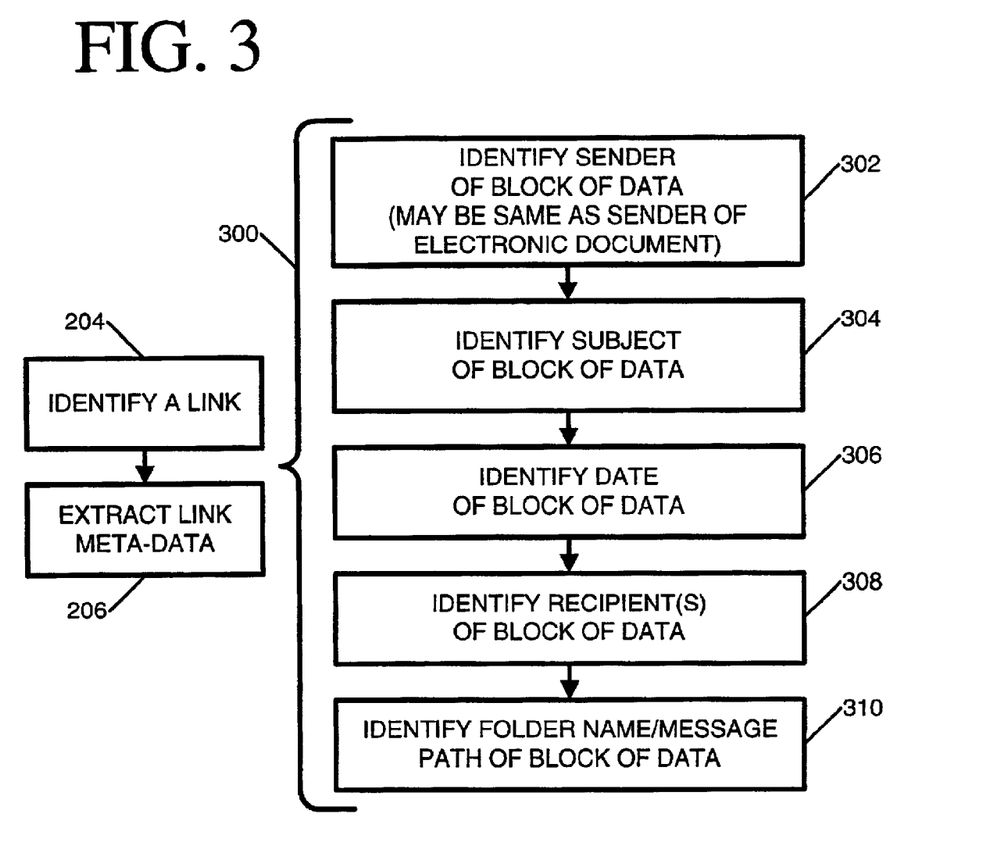
FIG. 3 illustrates exemplary meta-data that is identified and extracted from a block of data within a FIG. 2 electronic document.

FIG. 3 illustrates exemplary meta-data 300 that is identified 204 and extracted 206 from a block of data within a FIG. 2 electronic document. It will be appreciated that an electronic document may comprise a single block of data, or multiple blocks of data, each having their own links therein.

In one embodiment, extraction 206 is handled by a filter agent, such as one defined within the Microsoft Outlook E-mail application program. Extracted links may be stored in a proprietary format, or stored in format convenient to a viewing application program. For example, if Microsoft Internet Explorer is going to be used to display a view 400 (FIG. 4), then the links may be stored in an Microsoft Internet Explorer favorites. If the view is going to be displayed in a Netscape browser, then the links may be stored in Netscape's bookmark database.

In one embodiment, the agent may be configured to operate "on demand," or as a background task. For example, in Microsoft Outlook, a rule may be defined to run the agent automatically based on certain triggering events, such as on receipt of a message, when an E-mail folder is opened or closed, when a message is deleted, etc. In other environments, background tasks may be defined accordingly. In a rule-based environment such at Microsoft Outlook, the agent is just one of the executable rules.

When the agent identifies 204 a link, such as a URL in an E-mail message, the agent saves the URL as discussed above, along with extracted 206 meta-data. In one embodiment, extracted meta-data for a block of data comprises a sender 302, subject 304, date 306, recipients 308 of the block of data, and a folder name or message path 310 of the link. It will be appreciated that the agent may also identify other characteristics or fields of the block of data (not illustrated). For example, an E-mail message may have many fields, e.g., X-Agent, X-Context, etc., that may be extracted and stored.

As discussed above for FIG. 2, extracted 206 and supplied 210 meta-data is stored 212 in a collective along with the identified 204 link. Known meta-data from a single or multiple blocks of data can be combined in a single place, e.g., the collective, and viewed as desired as discussed below.

Figure 4:
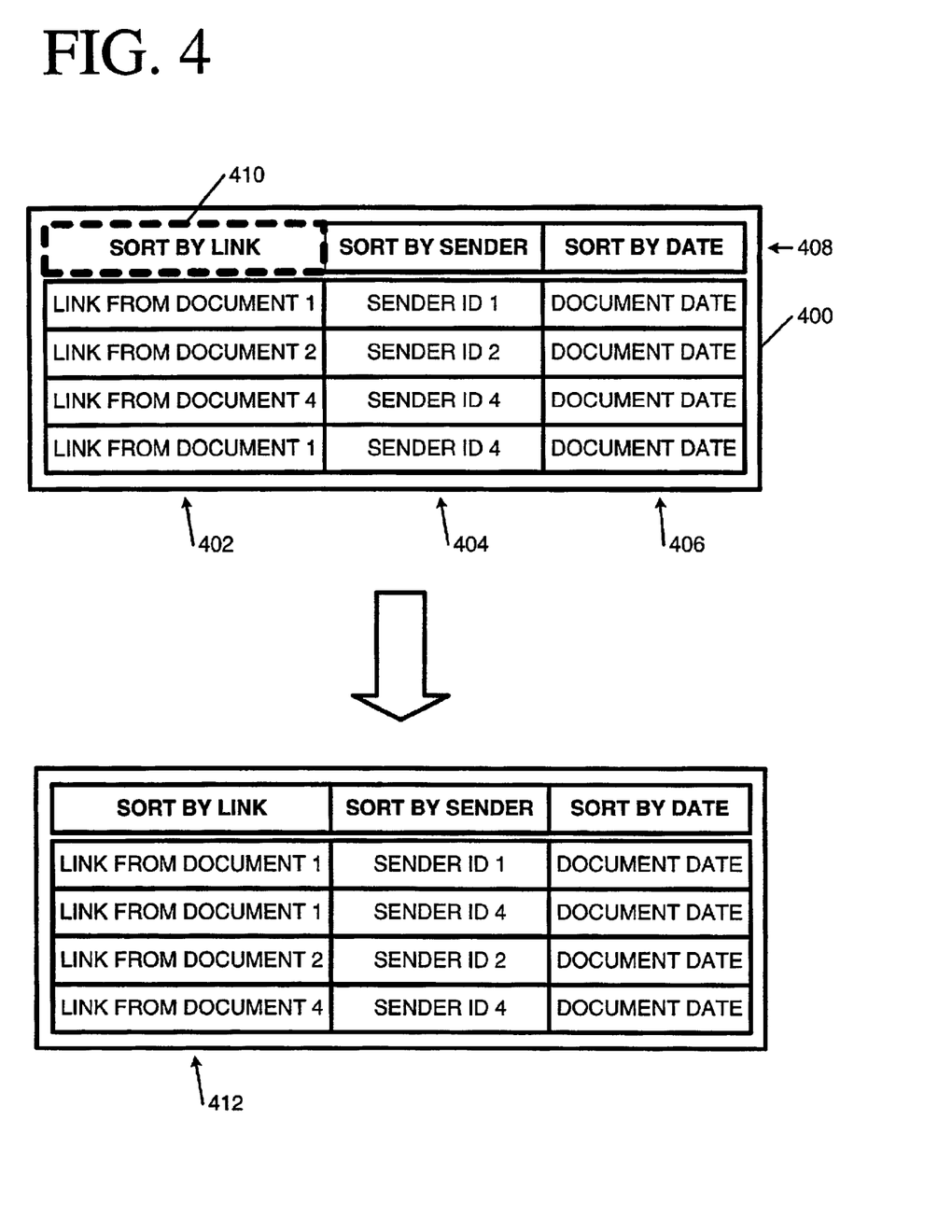
FIG. 4 illustrates, according to one embodiment, an exemplary view defined to display links received within multiple electronic documents, along with associated meta-data.

FIG. 4 illustrates, according to one embodiment, an exemplary view 400 defined to display links 402 received from multiple electronic documents, along with associated meta-data comprising an identifier 404 indicating the sender of the document that contained the link, and an identifier 406 indicating the date of sending of the document. These links and meta-data are displayed in a tabular format, and provide a simple view for links that may have been received in multiple documents.

In this exemplary view, there are buttons 408 to allow sorting the tabular view according to the contents of the table column. For example, selecting the illustrated "Sort By Link" button 410, in one embodiment, results in the view being organized such that links within a particular document are grouped 412 together. It will be appreciated that any characteristic of links and meta-data may be used to control sorting and/or aggregation of links. It will be further appreciated that other user interface configurations may be used to control display of the links and meta-data.

In one embodiment, an organizer program, which may be a standalone filtering application program, or a component of another application program, is responsible for organizing display of links and other meta-data. In one embodiment, a user may enter search or qualifying criteria controlling links displayed in a particular view. It will be appreciated that many different query-by-example, keyword, field-based and expert system based mechanisms may be utilized to determine contents of a particular view. Viewing criteria may be saved for re-use.

Figure 5:
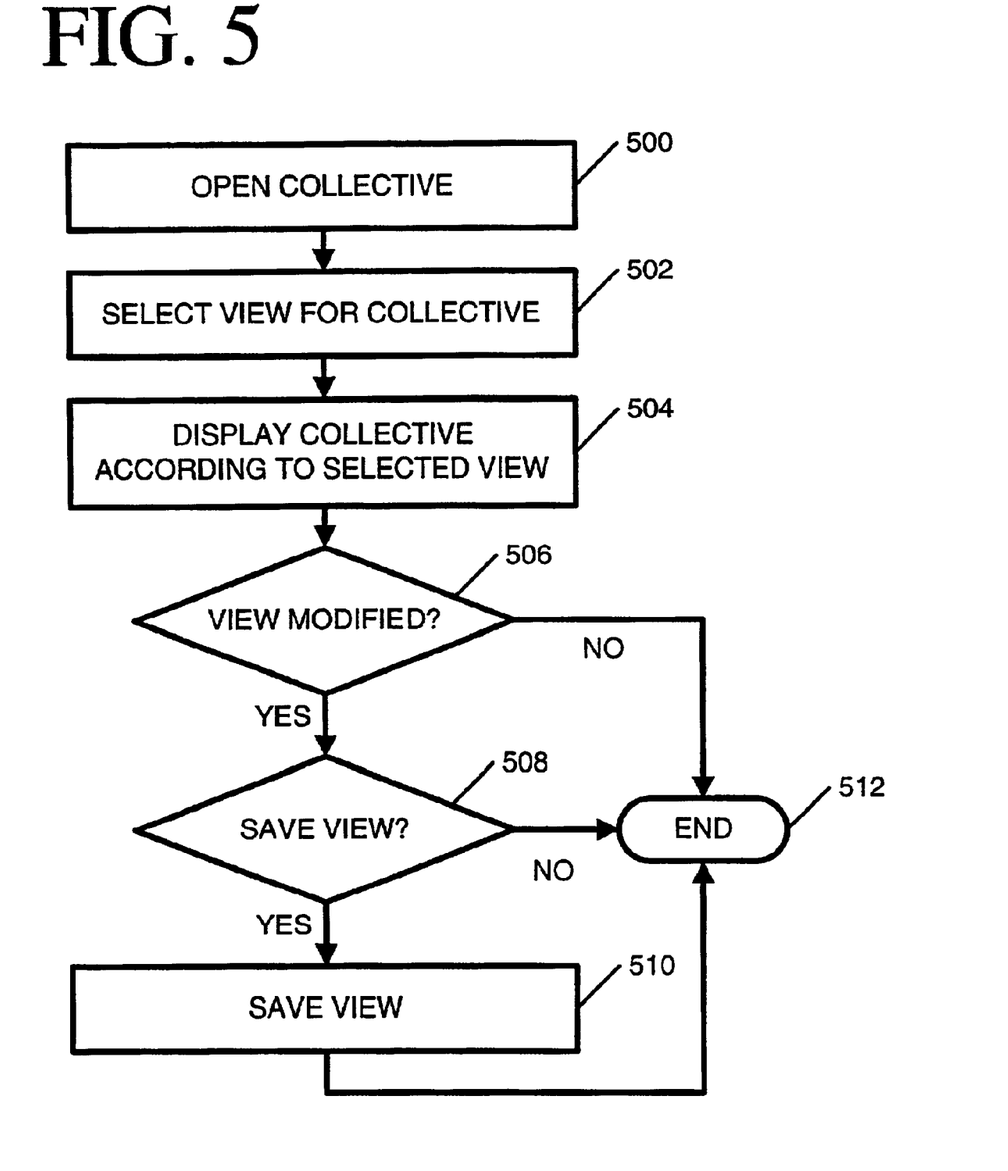
FIG. 5 is a flowchart for using a view to organize and display identified links and extracted meta-data.

FIG. 5 is a flowchart for using a view, such as the FIG. 4 view, to organize and display identified links and extracted meta-data. In the illustrated embodiment, a first operation is to open 500 a collective, e.g., a database or other storage, comprising stored identified links and extracted meta-data. The format of the collective has no bearing on what is displayed, thus different storage formats may be used depending on different operating system and other factors that may impact performance. For example, in one environment, storing the collective as an XML document may provide the best performance results, while in another environment, storing the document as a binary database may provide superior performance.

A view is then selected 502. As discussed above in FIG. 4, in one embodiment, selection may be according to input received by a user interface, e.g., in response to keystrokes, mouse selection, etc. Alternatively, in another embodiment, a view may be selected automatically without user activity, e.g., by loading a default view, loading a last-used view, or applying an expert system to analyze the collection and select an initial view for the collective based on characteristics of the collective.

The view is then displayed 504 according to the selected view. In one embodiment, the viewer for the collective is an Internet browser, such as by Microsoft Corporation or Netscape Communications, Inc. In this embodiment, the collective contents are organized according to the view and the view encoded in a format well understood by the browser. For example, HTML, XML, Java, JavaScript, or other browser-supported encoding may be used to encode the view for display by the browser. Since the collective may be encoded in a format not natively understood by the viewer of a view on the collective, it will be appreciated that the collective may be translated into an arbitrary format as required for non-browser viewers.

In one embodiment, a user interface allows a user to re-arrange a particular view. Thus, in this embodiment, a test is performed to determine if 506 the view was modified. If yes, a further test is performed to determine if 508 the modified view should be saved. A user-may elect to discard changes. If 508 yes, then the current view is saved 510. In embodiments where a last-used view is re-used, this saved view may be used to subsequently display the collective.

If 506 the view was not modified, or if 508 it should not be saved, then processing ends 512.

Figure 6:
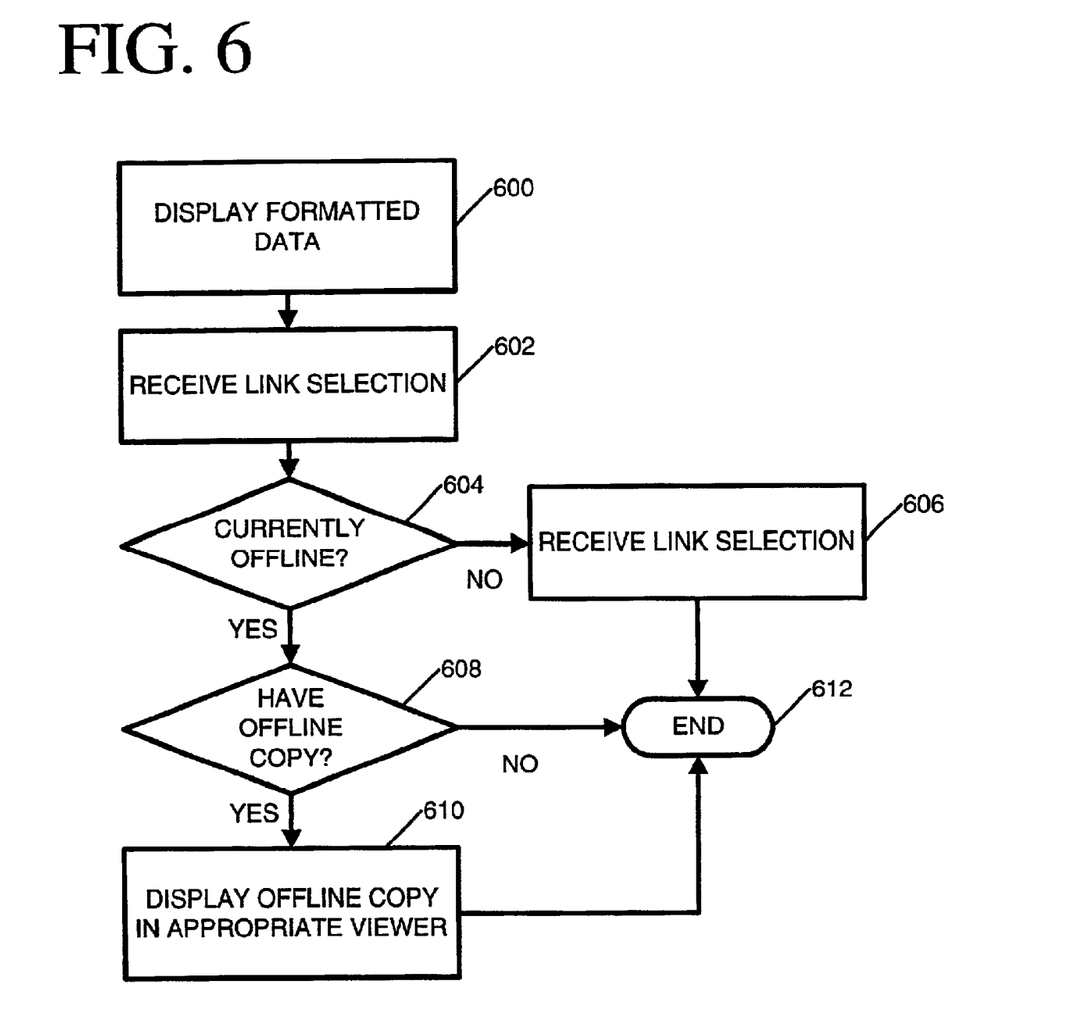
FIG. 6 illustrates displaying a view on a collective when not in contact with a network to which links in the collective refer.

FIG. 6 illustrates displaying a view on a collective when not in contact with a network to which links in the collective refer. For example, displaying a view on a collective with an Internet browser, when the browser is offline and URLs or other links in the collective therefore reference resources on the offline network. As illustrated, a first operation is to display 600 formatted data comprising a view of the collective, as converted, if required, according to the requirements of the viewer application program. The collective may be in a proprietary data format, or in a format directly supported by the viewing application program.

For example, in an E-mail application program, a URL filter agent may operate on E-mail messages to retrieve embedded URLs and associated meta-data, and store this data in Microsoft Explorer Favorites or Netscape Bookmarks in accordance with configuration and specified rules. The Internet browser would be able to directly access this data without conversion. In one embodiment, where links are stored as Microsoft Explorer Favorites or Netscape Bookmarks, offline caching functionality of the browser is used to maintain an offline copy of the data referenced by the link.

In one embodiment, if a link is not a URL or other link format compatible with the browser, the link is converted into a compatible URL reference. In one embodiment, for links that cannot be converted into a URL, a helper, such as an external server, helper application, server service, or the like, is provided to de-reference links that cannot be converted for the browser. For example, a URL may be created that points to a virtual resource of the helper, where the original unsupported link is passed to the helper, such as through an argument within the pseudo-URL. The helper may then retrieve the linked data on behalf of the browser and allow the browser to store the data offline.

In another embodiment, an operating system is configured to retain content for offline use, where storage of offline content may be made available to only the operating system, to only a single application program, or to some or all application programs. In this embodiment, the operating system may store an offline copy of linked data in a first format, and dynamically convert it, if necessary, into a second format depending on characteristics of an application program accessing the linked data.

If a link within the displayed 600 view (see, e.g., FIG. 4) is selected 602, a test is performed to determine if 604 the network to which the link refers is offline or otherwise unavailable. If not offline, then the linked content may be directly retrieved 606 and processing ends. In an alternate embodiment, not illustrated, to avoid a link losing its original context, when the link is initially received, linked data is stored offline and used thereafter to prevent any updates to the online data from interfering with the context of the originally received link.

However, as illustrated, if 604 offline, a test is performed to determine if 608 an offline copy has been retained, e.g., by way a browser, operating system, custom application program and/or agent implementing the invention, etc. If an offline copy is available, then an offline copy of the linked data is displayed 610 in the viewer. If no offline copy is available, then processing ends 612, perhaps with error handling (not illustrated). Note that even if a browser is used to view the collective, certain linked data types may require using a non-browser application to view the data. For example, a link to an audio file may require using an operating system media player, browser plug-in, helper application, or the like.

Figure 7:
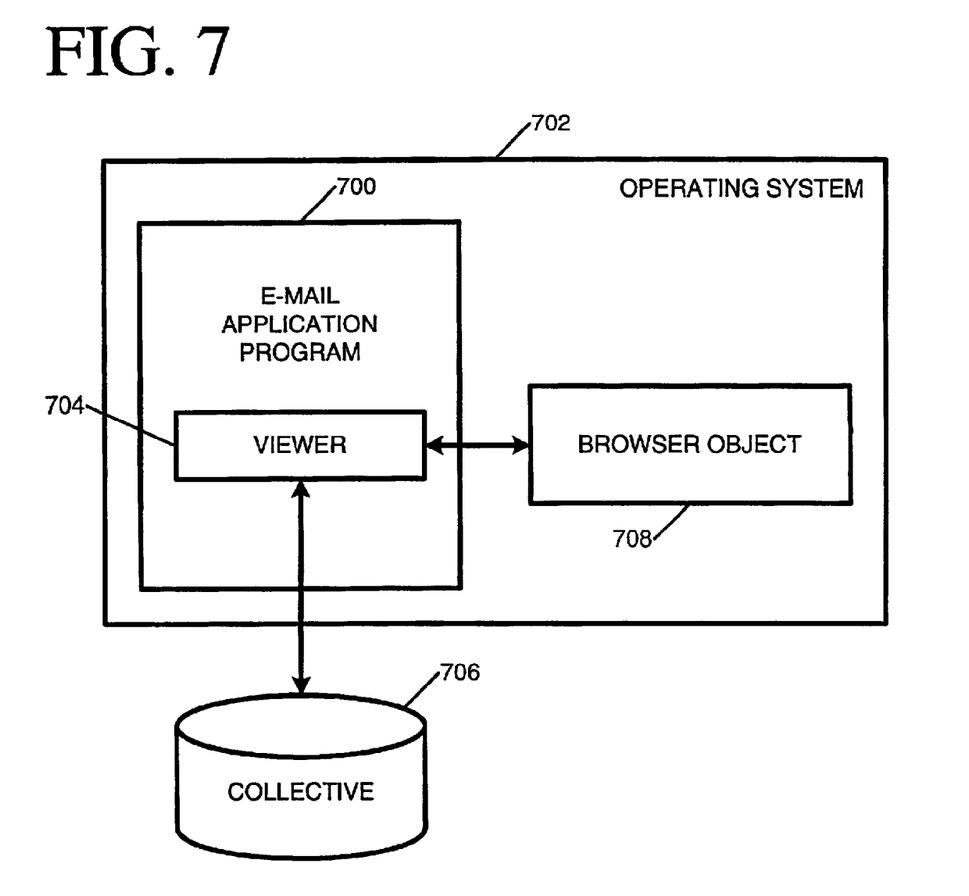
FIG. 7 illustrates one embodiment in which an E-mail application program utilizes a built-in viewer to view and manipulate a collective.

FIG. 7 illustrates one embodiment in which an E-mail application program 700, executing within an operating system 702, e.g., Microsoft Windows 9x/2000/NT/CE/etc., Macintosh, Unix variants, etc., utilizes a built-in viewer 704 to view and manipulate a collective 706. It will be appreciated by one skilled in the art that the viewer 704 may only be logically embedded, e.g., it may be an external library or an application program called by the E-mail application program 700 and executing on behalf thereof.

In the illustrated embodiment, the viewer makes use of an Operating System 702 Browser Object 708 that may be called to provide browser functionality to application programs, such as the E-mail application program, that may be operating within the operating system. Exemplary examples of Browser Objects 708 are the Microsoft Foundation Class CHtmlView class, and the Windows Foundation Classes for Java HTMLControl class. It will be appreciated by one skilled in the art that other controls, classes or libraries may be available in different operating systems 702 to provide equivalent browser functionality. These exemplary objects presume a Microsoft compatible operating system.

Thus, an E-mail program may provide for offline viewing of E-mail messages, and provide integrated therein, the viewer 704 that, by way of the browser object, allows a user to organize and view a collective storing links from multiple E-mail messages.

Figure 8:
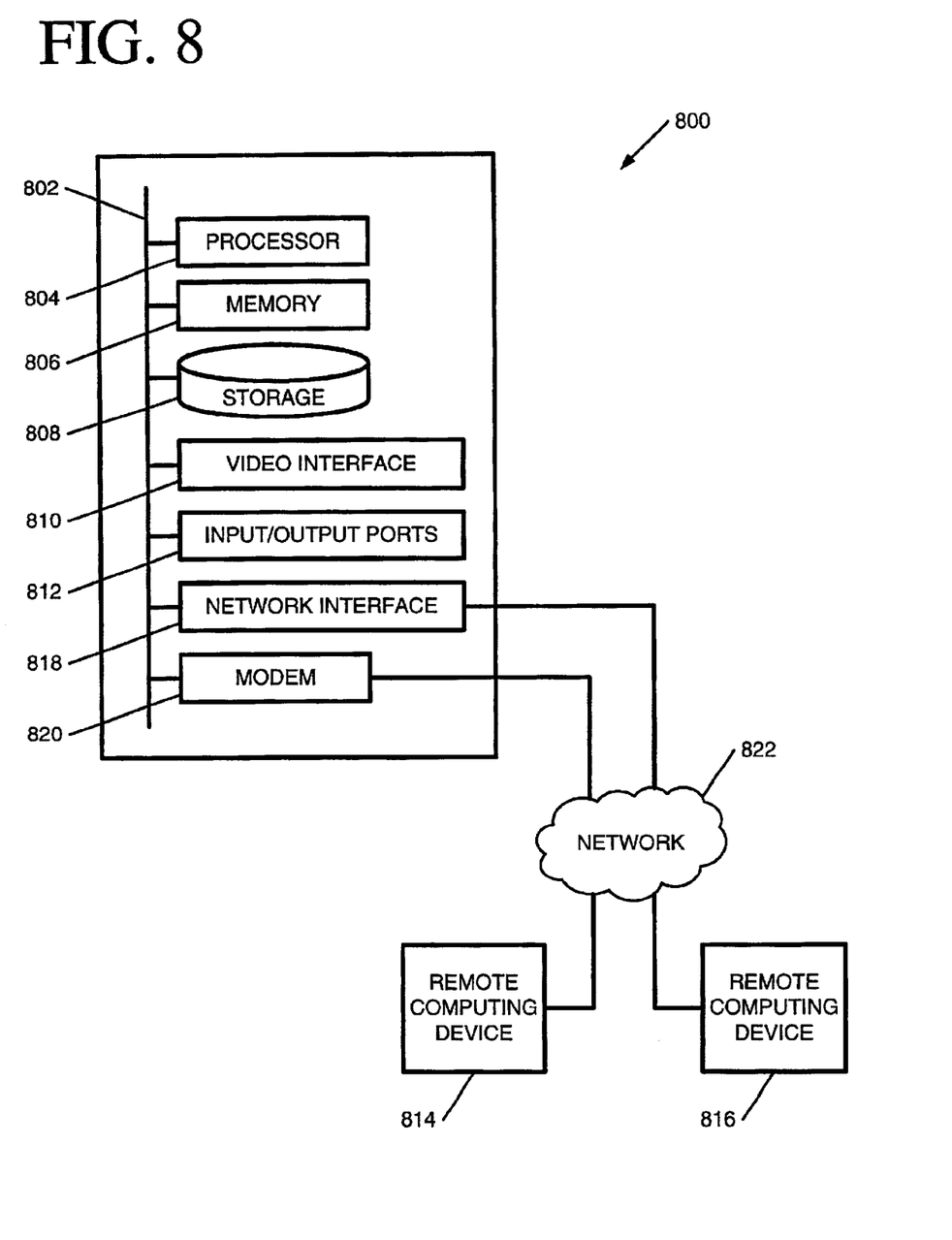
FIG. 8 illustrates a suitable computing environment in which certain aspects of the invention may be implemented.

FIG. 8 and the following discussion are intended to provide a brief, general description of a suitable computing environment in which certain aspects of the illustrated invention may be implemented. For example, an exemplary system for embodying the Operating System 702, or for executing the flowchart of FIG. 2, includes a machine 800 having system bus 802 for coupling various machine components.

Typically, attached to the bus are processors 804, a memory 806 (e.g., RAM, ROM), storage devices 808 such as hard-drives, floppy-disks, optical storage, cassettes, tapes, flash memory cards, memory sticks, digital video disks, and biological storage, a video interface 810, and input/output interface ports 812. The machine may also include embedded controllers, Programmable Logic and Gate Arrays, Application Specific Integrated Circuits (ASIC), smart cards, etc.

The machine is expected to operate in a networked environment using logical connections to one or more remote machines 814, 816 through a network interface 818, modem 820, or other pathway. Machines may be interconnected by way of a wired or wireless network 822 including an intranet, the Internet, cellular, cable, laser, satellite, microwave, Blue Tooth, optical, infrared, or other carrier technology.

The invention may be described by reference to different high-level program modules and/or low-level hardware instructions that may be stored in memory 806 and/or storage devices 808. One skilled in the art will recognize that program modules and low-level instructions can be interchanged. Program modules include procedures, functions, programs, components, data structures, etc., for particular tasks or abstract data types. Program modules may be compressed, encrypted, or encoded; this may require them to be decrypted, decompressed, decoded, compiled, interpreted, etc. to allow their utilization. Program modules may be implemented within a single machine, or distributed and/or executed across wired and wireless networks.

Thus, for example, with respect to the illustrated embodiments, assuming machine 800 operates the E-mail application program 700 of FIG. 7, then remote devices 814, 816 may respectively be an originator of an E-mail message containing a URL link to a networked resource, and a document server providing an electronic document containing a link to another networked resource.

Having described and illustrated the principles of the invention with reference to illustrated embodiments, it will be recognized that the illustrated embodiments can be modified in arrangement and detail without departing from such principles. It will be appreciated that remote machines 814, 816 may be configured like machine 800, and therefore include many or all of the elements discussed for machine. It should also be appreciated that machines 800, 814, 816 may be embodied within a single device, or separate communicatively-coupled components.

And, even though the foregoing discussion has focused on particular embodiments, it is understood other configurations are contemplated. In particular, even though expressions such as "in one embodiment," "in another embodiment," or the like are used herein, these phrases are meant to generally reference embodiment possibilities, and are not intended to limit the invention to particular embodiment configurations. Unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for an application program communicatively coupled to a network to process Uniform Resource Locators (URL), comprising:
   receiving a block of data;
   executing an agent to identify a URL within the block of data;
   extracting meta-data associated with the URL describing the block of data;
   storing the URL and said extracted meta-data in a collective; and
   organizing the collective.

2. The method of claim 1, further comprising:
   annotating said stored URL with annotations.

3. The method of claim 2, the block of data comprising fields, the method further comprising:
   displaying a user interface;
   displaying within the user interface said fields, and corresponding selectable regions, wherein selection thereof for a field causes storage of the field within the collective; and
   displaying within the user interface an annotation region for entering said annotations.

4. The method of claim 1, the block of data comprising fields, the method further comprising:

displaying a user interface; and displaying within the user interface said fields, and corresponding selectable regions, wherein selection thereof for a field causes storage of the field within the collective.

5. The method of claim 1, wherein said extracting is performed with respect to an extraction policy.

6. The method of claim 1, further comprising:

wherein the URL comprises a machine reference to a resource location path; and wherein said organizing is based at least in part on the contents of said path.

7. The method of claim 1, further comprising, wherein said organizing is based at least in part on a characteristic of the URL, said characteristic being a selected one of: a domain, a machine identifier, and a resource location path.

8. The method of claim 1, wherein said organizing is based at least in part on said meta-data.

9. The method of claim 8, further comprising:

wherein the block of data comprises an Electronic Mail (E-mail) message; and wherein said meta-data comprises selected ones of: a sender of the block of data, a subject of the block of data, a sending time or date for the block of data, a recipient of the block of data, a storage destination for the block of data, and user defined data fields associated with the block of data.

10. The method of claim 8, wherein said meta-data comprises: a sender of the block of data, a subject of the block of data, a sending time or date for the block of data, a recipient of the block of data, a storage destination for the block of data, and user defined data fields associated with the block of data.

11. An apparatus, comprising a tangible readable medium having instructions encoded thereon for execution by a processor, said instructions capable of directing the processor to perform:

receiving a block of data;

executing an agent to identify a URL within the block of data;

extracting meta-data associated with the URL describing the block of data;

storing the URL and said extracted meta-data in a collective; and organizing the collective.

12. The apparatus of claim 11, said instructions further comprising instructions capable of directing the processor to perform:

annotating said stored URL with annotations.

13. The apparatus of claim 12, said instructions further comprising instructions capable of directing the processor to perform:

displaying a user interface;

displaying within the user interface a field identifier associated with the block of data, and corresponding selectable regions, wherein selection thereof for a field causes storage of the field within the collective; and displaying within the user interface an annotation region for entering said annotations.

14. The apparatus of claim 11, said instructions further comprising instructions capable of directing the processor to perform:

displaying a user interface; and displaying within the user interface a field identifier associated with the block of data, and corresponding selectable regions, wherein selection thereof of a field causes storage of the field within the collective.

15. The apparatus of claim 11, said instructions for said organizing comprising instructions capable of directing the processor to perform:

organizing based at least in part on a characteristic of the URL, said characteristic being a selected one of: a domain, a machine identifier, and a resource location path.

16. The apparatus of claim 11, said instructions for said organizing comprising instructions capable of directing the processor to perform said organizing based at least in part on said meta-data, the apparatus further comprising:

wherein the block of data comprises an Electronic Mail (E-mail) message; and wherein said meta-data comprises selected ones of: a sender of the block of data, a subject of the block of data, a sending time or date for the block of data, a recipient of the block of data, a storage destination for the block of data, and user defined data fields associated with the block of data.

17. An apparatus, comprising:

means for receiving a block of data;

means for executing an agent to identify a URL within the block of data;

means for extracting meta-data associated with the URL describing the block of data;

means for storing the URL and said extracted meta-data in a collective; and means for organizing the collective.

18. The apparatus of claim 17, further comprising:

means for annotating said stored URL with annotations;

means for displaying a user interface;

means for displaying within the user interface said field identifiers, and corresponding selectable regions, wherein selection thereof for a field causes storage of the field within the collective; and means for displaying within the user interface an annotation region for entering said annotations.

19. The apparatus of claim 18, further comprising:

means for displaying a user interface; and means for displaying within the user interface said field identifiers, and corresponding selectable regions, wherein selection thereof for a field causes storage of the field within the collective.

20. The apparatus of claim 17, further comprising:

means for organizing based at least in part on a characteristic of the URL, said characteristic being a selected one of: a domain, a machine identifier, and a resource location path.

21. The apparatus of claim 17, further comprising:

means for executing the application program within an operating system providing offline storage for content retrievable over the network; and means for configuring said offline storage to retrieve said content identified by the URL.

22. The apparatus of claim 17, further comprising:

means for executing the application program within an operating system providing offline storage for content retrievable over the network; and means for configuring said offline storage so that said content identified by the URL is retrieved in accordance with said policy.

23. An apparatus, comprising:

means for receiving, with the application program, a block of data comprising an electronically distributable document;

means for identifying the URL within the block of data;

means for adding an entry to a collective, the entry including the URL and origin data corresponding to the URL;

means for retrieving content identified by the URL according to an applicable policy; and means for storing said retrieved content within the collective.

24. The apparatus of claim 23, further comprising:

means for retrieving selected content when the application program operates on the block of data, retrieving selected content based at least in part on an expert system, and retrieving selected content based at least in part on pattern matching.

25. The apparatus of claim 24, further comprising:

means for preparing a list of the URLs within the block of data;

means for displaying an interface allowing selection of URL entries of the list; and means for performing said retrieving content for a selected entry of the list.

26. A tangible medium storing machine-accessible data received over a propagated signal, wherein the data, when accessed, results in a machine performing:

receiving a block of data;

executing an agent to identify a URL within the block of data;

extracting meta-data associated with the URL describing the block of data;

storing the URL and said extracted meta-data in a collective; and organizing the collective.

27. The propagated signal of claim 26 wherein the machine-accessible data further includes data, when accessed, results in the machine performing:

annotating said stored URL with annotations.

28. The propagated signal of claim 27, wherein the block of data includes fields, and wherein the machine-accessible data further includes data, when accessed, results in the machine performing:

displaying a user interface;

displaying within the user interface said fields, and corresponding selectable regions, wherein selection thereof for a field causes storage of the field within the collective; and displaying within the user interface an annotation region for entering said annotations.

29. The propagated signal of claim 26, wherein the block of data includes fields, and wherein the machine-accessible data further includes data, when accessed, results in the machine performing:

displaying a user interface; and displaying within the user interface said fields, and corresponding selectable regions, wherein selection thereof for a field causes storage of the field within the collective.

30. The propagated signal of claim 26, wherein said extracting is performed with respect to an extraction policy.

31. The propagated signal of claim 26, further comprising:

wherein the URL comprises a machine reference to a resource location path; and wherein said organizing is based at least in part on the contents of said path.

32. The propagated signal of claim 26, wherein said organizing is based at least in part on a characteristic of the URL, said characteristic being a selected one of: a domain, a machine identifier, and a resource location path.

33. The propagated signal of claim 26, wherein said organizing is based at least in part on said meta-data.

34. The propagated signal of claim 33, further comprising:

wherein the block of data comprises an Electronic Mail (E-mail) message; and wherein said meta-data comprises selected ones of: a sender of the block of data, a subject of the block of data, a sending time or date for the block of data, a recipient of the block of data, a storage destination for the block of data, and user defined data fields associated with the block of data.

35. The propagated signal of claim 33, wherein said meta-data comprises: a sender of the block of data, a subject of the block of data, a sending time or date for the block of data, a recipient of the block of data, a storage destination for the block of data, and user defined data fields associated with the block of data.

* * * * *